(12) United States Patent
Ryan et al.

(10) Patent No.: US 9,175,568 B2
(45) Date of Patent: *Nov. 3, 2015

(54) METHODS FOR MANUFACTURING TURBINE COMPONENTS

(75) Inventors: Daniel Ryan, Phoenix, AZ (US); Mark C. Morris, Phoenix, AZ (US); Donald G. Godfrey, Phoenix, AZ (US); Steve Starr, Scottsdale, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 87 days.

This patent is subject to a terminal disclaimer.

(21) Appl. No.: 12/820,652

(22) Filed: Jun. 22, 2010

(65) Prior Publication Data

US 2011/0311389 A1 Dec. 22, 2011

(51) Int. Cl.
| | |
|---|---|
| B22F 3/26 | (2006.01) |
| F01D 5/14 | (2006.01) |
| B22F 3/105 | (2006.01) |
| B22F 3/15 | (2006.01) |
| B22F 5/04 | (2006.01) |
| F01D 5/18 | (2006.01) |
| B23P 17/00 | (2006.01) |

(52) U.S. Cl.
CPC .............. *F01D 5/147* (2013.01); *B22F 3/1055* (2013.01); *B22F 3/15* (2013.01); *B22F 3/26* (2013.01); *B22F 5/04* (2013.01); *F01D 5/18* (2013.01); *F05D 2230/22* (2013.01); *Y02T 50/673* (2013.01); *Y02T 50/676* (2013.01); *Y10T 29/49229* (2015.01)

(58) Field of Classification Search
USPC .............................................. 419/27; 29/888
See application file for complete search history.

(56) References Cited

U.S. PATENT DOCUMENTS

| | | |
|---|---|---|
| 4,145,481 A | 3/1979 | Gupta et al. |
| 4,198,442 A | 4/1980 | Gupta et al. |
| 4,382,976 A | 5/1983 | Restall |
| RE31,339 E | 8/1983 | Dardi et al. |
| 4,499,048 A | 2/1985 | Hanejko |
| 4,687,678 A | 8/1987 | Lindblom |
| 4,818,562 A | 4/1989 | Arcella et al. |
| 5,096,518 A | 3/1992 | Fujikawa et al. |
| 5,106,266 A | 4/1992 | Borns et al. |

(Continued)

FOREIGN PATENT DOCUMENTS

| | | |
|---|---|---|
| DE | 2104062 A1 | 8/1972 |
| DE | 102008056336 A1 | 5/2010 |

(Continued)

OTHER PUBLICATIONS

Loeber, L., et al.; Comparison of Selective Laser and Electron Beam Melted Titanium Aluminides, published Sep. 24, 2011, pp. 547-556.

(Continued)

*Primary Examiner* — Rebecca Lee
(74) *Attorney, Agent, or Firm* — Ingrassia Fisher & Lorenz, P.C.

(57) ABSTRACT

A method is provided for manufacturing a turbine component. The method includes forming a first intermediate turbine article with an additive manufacturing process; encapsulating the first intermediate turbine article with an encapsulation layer to form a second intermediate turbine article; and consolidating the second intermediate turbine article to produce the turbine component.

14 Claims, 9 Drawing Sheets

(56) References Cited

U.S. PATENT DOCUMENTS

| | | |
|---|---|---|
| 5,128,179 A | 7/1992 | Baldi |
| 5,236,116 A | 8/1993 | Solanki et al. |
| 5,249,785 A | 10/1993 | Nelson et al. |
| 5,465,780 A | 11/1995 | Muntner et al. |
| 5,514,482 A | 5/1996 | Strangman |
| 5,634,992 A | 6/1997 | Kelly et al. |
| 5,640,667 A | 6/1997 | Freitag et al. |
| 5,650,235 A | 7/1997 | McMordie et al. |
| 5,745,834 A | 4/1998 | Bampton et al. |
| 5,837,960 A | 11/1998 | Lewis et al. |
| 5,947,179 A | 9/1999 | Kinane et al. |
| 6,049,978 A | 4/2000 | Arnold |
| 6,154,959 A | 12/2000 | Goodwater et al. |
| 6,172,327 B1 | 1/2001 | Aleshin et al. |
| 6,174,448 B1 | 1/2001 | Das et al. |
| 6,269,540 B1 | 8/2001 | Islam et al. |
| 6,270,914 B1 | 8/2001 | Ogasawara et al. |
| 6,355,116 B1 | 3/2002 | Chen et al. |
| 6,447,924 B1 | 9/2002 | Bettridge |
| 6,485,848 B1 * | 11/2002 | Wang et al. .................. 428/697 |
| 6,504,127 B1 | 1/2003 | McGregor et al. |
| 6,568,077 B1 | 5/2003 | Hellemann et al. |
| 6,575,349 B2 | 6/2003 | Van Esch |
| 6,676,892 B2 | 1/2004 | Das et al. |
| 6,758,914 B2 | 7/2004 | Kool et al. |
| 6,838,191 B1 | 1/2005 | Raj |
| 6,884,461 B2 | 4/2005 | Ackerman et al. |
| 6,969,457 B2 | 11/2005 | MacDonald et al. |
| 7,216,428 B2 | 5/2007 | Memmen et al. |
| 7,270,764 B2 | 9/2007 | Wustman et al. |
| 7,651,658 B2 | 1/2010 | Aimone et al. |
| 7,794,800 B2 | 9/2010 | Clark et al. |
| 7,829,142 B2 | 11/2010 | Kool et al. |
| 2001/0014403 A1 | 8/2001 | Brown et al. |
| 2003/0037436 A1 | 2/2003 | Ducotey, Jr. et al. |
| 2003/0088980 A1 * | 5/2003 | Arnold ........................ 29/889.1 |
| 2003/0217915 A1 | 11/2003 | Quellet et al. |
| 2004/0009635 A1 | 1/2004 | Nakasato et al. |
| 2005/0036892 A1 | 2/2005 | Bajan |
| 2005/0091848 A1 | 5/2005 | Nenov et al. |
| 2005/0133527 A1 | 6/2005 | Dullea et al. |
| 2006/0013820 A1 | 1/2006 | Bonnet et al. |
| 2006/0177582 A1 | 8/2006 | Chandra et al. |
| 2006/0222776 A1 | 10/2006 | Madhava et al. |
| 2007/0000772 A1 | 1/2007 | Ramm et al. |
| 2007/0084047 A1 | 4/2007 | Lange et al. |
| 2007/0107202 A1 | 5/2007 | Das |
| 2008/0014457 A1 | 1/2008 | Gennaro et al. |
| 2008/0290215 A1 | 11/2008 | Udall et al. |
| 2008/0304975 A1 | 12/2008 | Clark et al. |
| 2009/0081066 A1 | 3/2009 | Illston |
| 2009/0200275 A1 | 8/2009 | Twelves et al. |
| 2009/0255602 A1 | 10/2009 | McMasters et al. |
| 2010/0021289 A1 | 1/2010 | Grylls et al. |
| 2010/0025001 A1 | 2/2010 | Lee et al. |
| 2010/0028158 A1 | 2/2010 | Richter |
| 2010/0065142 A1 * | 3/2010 | McMasters et al. .......... 138/115 |
| 2010/0200189 A1 | 8/2010 | Qi et al. |
| 2010/0221567 A1 | 9/2010 | Budinger et al. |
| 2011/0106290 A1 | 5/2011 | Hövel et al. |
| 2011/0135952 A1 | 6/2011 | Morris et al. |
| 2012/0034101 A1 | 2/2012 | James et al. |

FOREIGN PATENT DOCUMENTS

| | | |
|---|---|---|
| EP | 0861919 A2 | 9/1998 |
| GB | 2279667 A | 1/1995 |
| JP | 5104259 A | 4/1993 |
| WO | 97/19776 A1 | 6/1997 |
| WO | 2008034413 A1 | 3/2008 |
| WO | 2008046387 A1 | 4/2008 |

OTHER PUBLICATIONS

Szuromi, et al.; Methods for Manufacturing Components from Articles Formed by Additive-Manufacturing Processes, filed with the USPTO on Sep. 16, 2011 and assigned U.S. Appl. No. 13/235,210.

Mittendorf, et al.; Methods for Repairing Turbine Components, U.S. Appl. No. 13/041,113, filed Mar. 4, 2011.

Godfrey, D. G., et al.: "Multi-Material Turbine Components" filed with the USPTO on Jan. 27, 2012 and assigned U.S. Appl. No. 13/360,126.

USPTO Office Action; Notification Date Dec. 22, 2014 for U.S. Appl. No. 13/360,126.

USPTO Office Action, Notification Date Sep. 17, 2014; U.S. Appl. No. 13/564,656.

Kothari, K., et al., "Microstructure and mechanical properties of consolidated gamma titanium aluminides". Powder Metallurgy, 2007, vol. 50, No. 1, pp. 21-27.

Wang, G.-X., et al., "TiAl-based high temperature materials made from extremely deformed elemental powders". Journal de Physique IV, Colloque C7, supplement au Journal de Physique III, vol. 3, Nov. 1993, pp. 469-472.

Godfrey, D. G. et al.: Titanium Aluminide Components and Methods for Manufacturing the Same from Articles Formed by Consolidation Processes, Filed with the USPTO on Aug. 1, 2012 and assigned U.S. Appl. No. 13/564,656.

EP Search Report for Application No. 12 184 142.3 dated Feb. 6, 2013.

USPTO Notice of Allowance Notification Date Jan. 26, 2015 for U.S. Appl. No. 13/564,656.

Friel, R.J., et al., "Ultrasonic additive manufacturing—A hybrid production process for novel functional products". Procedia CIRP 6 (2013) 35-40.

Gu. D.D., et al., "Laser additive manufacturing of metallic components: materials, processes and mechanisms". International Materials Reviews 2012, vol. 57, No. 3 pp. 133-164.

USPTO Office Action for U.S. Appl. No. 13/041,113; Notification date Apr. 15, 2014.

USPTO Notice of Allowance Notification Date Mar. 6, 2015 for U.S. Appl. No. 13/041,113.

EP Search Report for Application No. 12157966.8 dated Mar. 17, 2015.

Hussain et al.; Advanced Nanocomposites for High Temperature Aero-Engine/Turbine Components, Inderscience Publishers, International Journal of Nanomanufacturing; vol. 4, No. 1-4, 2009, pp. 248-256. Retrieved from Internet: <URL:www.inderscience.com>.

Mainier et al.; On the Effect of the Electroless Nickel—Phosphorus Coating Defects on the Performance of This Type of Coating in Oilfieled Enviornments, OnePetro, SPE Advanced Technology Series; vol. 2, No. 1, Mar. 1994.

Bi et al.; Feasibility Study on the Laser Aided Additive Manufacturing of Die Inserts for Liquid Forging, ScienceDirect, Materials & Design, vol. 31, Supplement 1, Jun. 2010, S112-S116.

Groth et al.; New Innovations in Diode Laser Cladding, Fraunhofer USA-Center for Surface and Laser Processing, 2002.

Clark et al.; Shaped Metal Deposition of a Nickel Alloy for Aero Engine Applications, SciencetDirect, Journal of Materials Processing Technology, 203, Jul. 2008, 439-448.

Electroless Nickel, New Hampshire Materials Laboratory, Inc., 1999.

\* cited by examiner

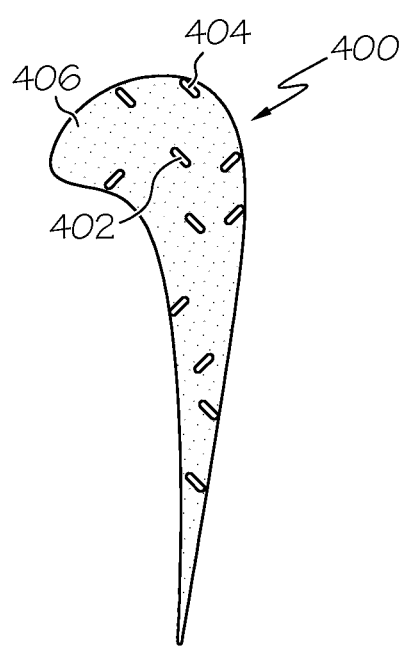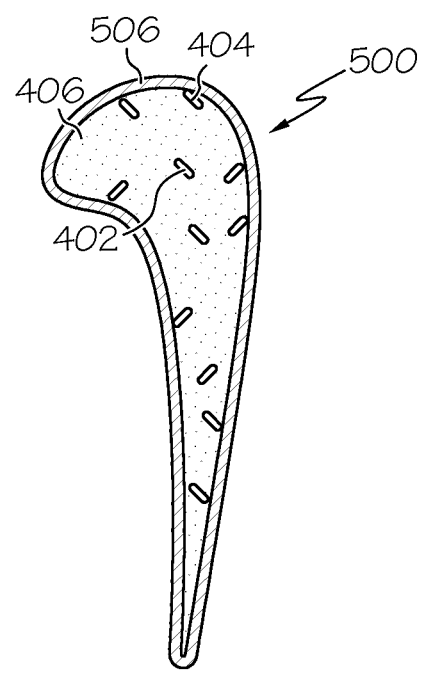
FIG. 4　　　　　　　　FIG. 5
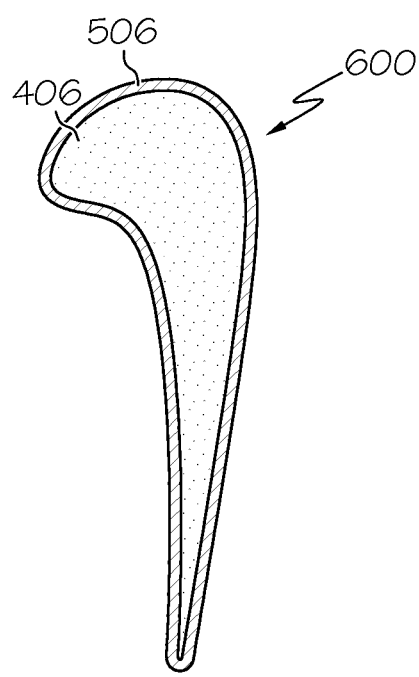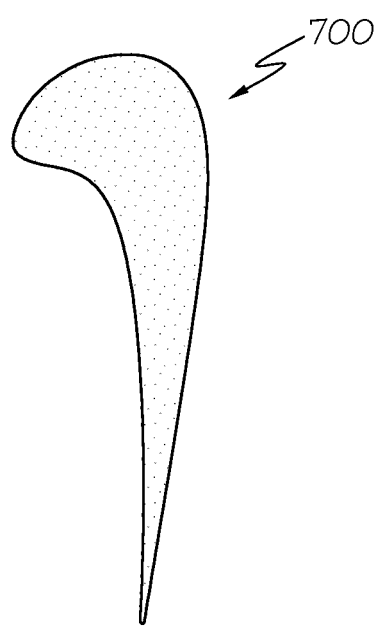
FIG. 6　　　　　　　　FIG. 7

METHODS FOR MANUFACTURING TURBINE COMPONENTS

TECHNICAL FIELD

The present invention generally relates to turbine engines, and more particularly relates to methods for manufacturing turbine components for engines.

BACKGROUND

Gas turbine engines are generally known in the art and used in a wide range of applications, such as propulsion engines and auxiliary power unit engines for aircraft. In a typical configuration, a turbine section of the engine includes turbine components such as rows of stator airfoils and rotor blades disposed in an alternating sequence along the axial length of a generally annular hot gas flow path. The rotor blades are mounted on the periphery of rotor disks coupled to a main engine shaft. The stator airfoils are coupled to inner and outer endwalls and optimally direct hot combustion gases to the rotor blades, thus resulting in rotary driving of the rotor disks to provide an engine output.

The stator airfoils and rotor blades typically have arcuate shapes with generally concave pressure sides and generally convex suction sides extending axially in chords between opposite leading and trailing edges. During operation, the aerodynamic contours of the stator airfoils and rotor blades, and corresponding flow passages therebetween, are configured in an attempt to maximize energy extraction from the combustion gases. Since higher engine efficiencies may occur at higher temperatures, some turbine components may additionally include internal cooling passages to enable such high temperature operation.

Given these considerations, turbine components may have relatively complex three-dimensional (3D) geometries that may raise difficult fabrication issues. Conventional fabricating techniques include forging, casting, and/or machining. For example, in one conventional casting process, a ceramic core is assembled into a wax tool that will provide the external shape of the component, the core is encased in wax, a ceramic shell is formed around the wax pattern, and the wax is removed to form a ceramic mold. Molten metal is then poured into the molds, cooled and solidified, and then the external shell and internal core are suitably removed to result in the desired turbine component. The cast turbine component may then undergo subsequent manufacturing processes such as machining, electrical discharge machining (EDM) or laser drilling. Such prior art methods are not only expensive and have long lead-times, but may additionally have low yields. Development time and cost for certain turbine components may also be magnified because such components generally require several iterations.

Accordingly, it is desirable to provide improved manufacturing methods for turbine components that enable improved cycle times and reduced costs without sacrificing component performance or durability. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a method is provided for manufacturing a turbine component. The method includes forming a first intermediate turbine article with an additive manufacturing process; encapsulating the first intermediate turbine article with an encapsulation layer to form a second intermediate turbine article; and consolidating the second intermediate turbine article to produce the turbine component.

In accordance with an exemplary embodiment, a method is provided for manufacturing a turbine component from a turbine article formed with a high energy beam. The method includes encapsulating the turbine article with an encapsulation layer; and consolidating the turbine article.

BRIEF DESCRIPTION OF THE DRAWINGS

The present invention will hereinafter be described in conjunction with the following drawing figures, wherein like numerals denote like elements.

FIG. 4 is a cross-sectional view of a first intermediate turbine article in the method of FIG. 3 in accordance with an exemplary embodiment;

FIG. 5 is a cross-sectional view of a second intermediate turbine article in the method of FIG. 3 in accordance with an exemplary embodiment;

FIG. 6 is a cross-sectional view of a third intermediate turbine article in the method of FIG. 3 in accordance with an exemplary embodiment;

FIG. 7 is a cross-sectional view of a completed turbine component in the method of FIG. 3 in accordance with an exemplary embodiment;

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein include methods for manufacturing turbine components of gas turbine engines. The turbine component is initially formed by an additive manufacturing technique such as direct metal laser sintering or electron beam melting. Other additive manufacturing methods may also be employed to create the component. The component is then encapsulated such that any surface connected defects (i.e. cracks, voids, lack of fusion and porosity) may effectively be considered internal defects. The encapsulated component then undergoes a consolidation treatment to substantially eliminate any defects, as well as any final treatments, to produce a finished turbine component.

Figure 1:
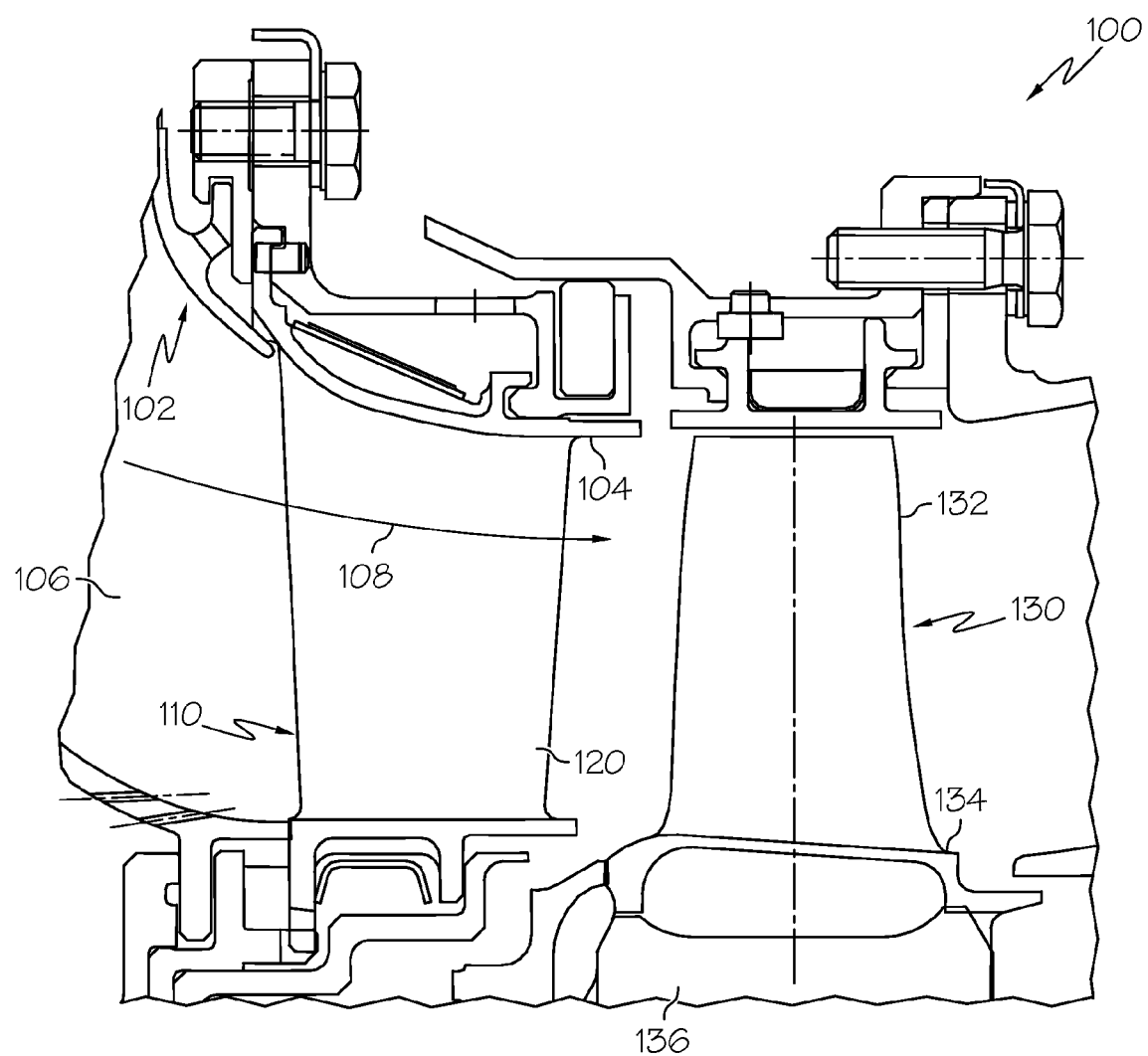
FIG. 1 is a partial cross-sectional view of a turbine section of a gas turbine engine assembly in accordance with an exemplary embodiment.

FIG. 1 is a fragmented vertical sectional view illustrating a partial turbine section 100 of a gas turbine engine assembly in accordance with an exemplary embodiment. The turbine section 100 and gas turbine engine assembly have an overall construction and operation that is generally understood by persons skilled in the art. In general terms, the turbine section 100 has a housing 102 with an annular duct wall 104 that defines a mainstream hot gas flow path 106 for receiving a flow of mainstream combustion gases 108 from an engine combustor (not shown). The housing 102 additionally houses at least one stator assembly 110 with stator vanes 120 and at least one turbine rotor assembly 130 with turbine rotor blades 132. The rotor blades 132 of the turbine rotor assembly 130 project radially outward from a turbine rotor platform 134 that is coupled to a turbine disk 136, which in turn circumscribes a shaft (not shown). The combustion gases 108 flow past axially spaced circumferential rows of stator vanes 120 and rotor blades 132 to drive the rotor blades 132 and the associated turbine rotor assembly 130 for power extraction. Other embodiments may be differently arranged.

Figure 2:
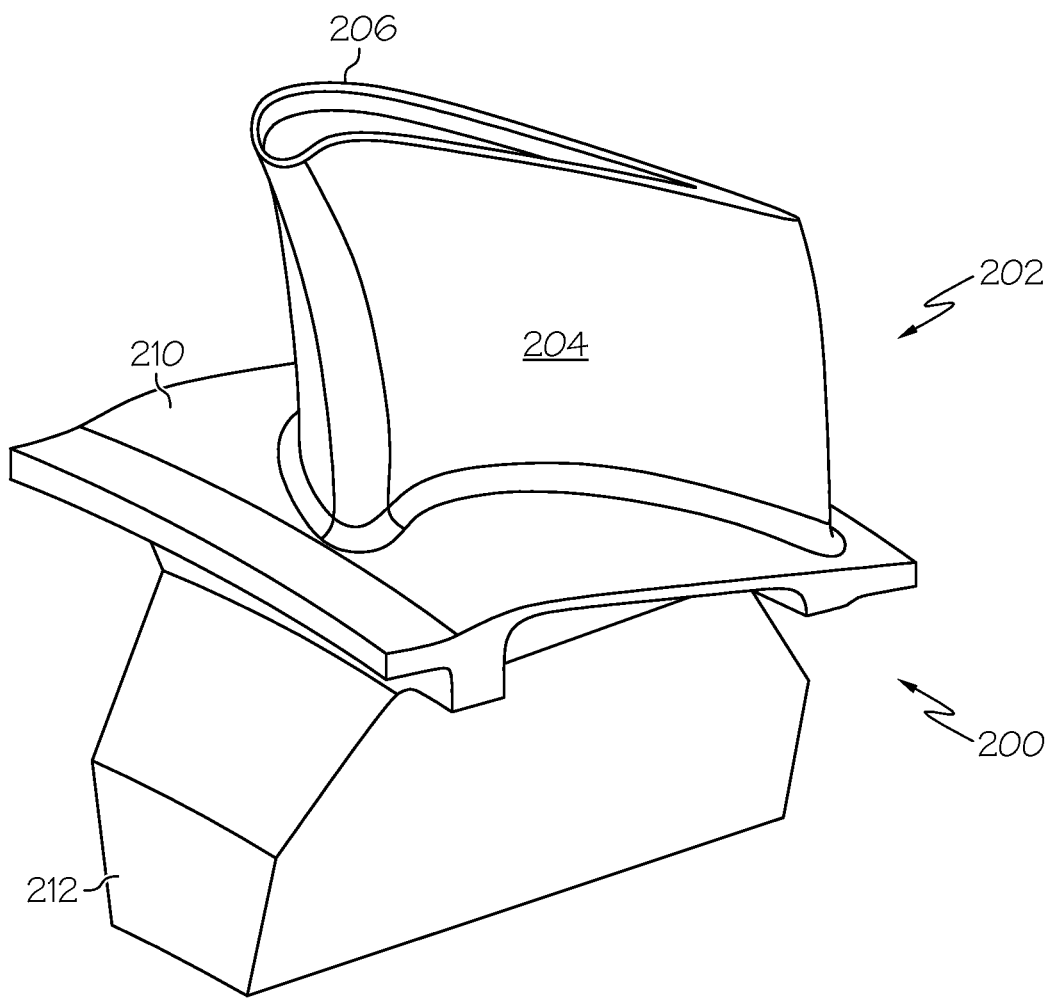
FIG. 2 is an isometric view of a turbine component in accordance with an exemplary embodiment.

FIG. 2 is an isometric view of a turbine component 200 in accordance with an exemplary embodiment and generally illustrates the relatively complex 3D geometric configuration typical of a turbine component, for example, that may be incorporated into the turbine section 100 of FIG. 1. Although the turbine component 200 in FIG. 2 is depicted as a rotor blade, such as rotor blade 132 (FIG. 1), the exemplary embodiments discussed herein are applicable to any type of turbine components, including stator vanes, such as stator vanes 120 (FIG. 1), and other types of engine components.

The turbine component 200 may include an airfoil 202 with a generally concave pressure side 204 and a generally convex suction side 206 opposed thereto. Each airfoil 202 may be coupled to a platform 210 that defines an inner boundary for the hot combustion gases that pass over airfoil 202 during engine operation. A mounting dovetail 212 may be integrally formed on the underside of the platform 210 for mounting the turbine component 200 within the turbine section 100. In this exemplary embodiment, the turbine component 200 is solid. However, as discussed in greater detail below, the turbine component 200 may additionally include internal passages or hollow areas to provide a cooling flow during engine operation.

Figure 3:
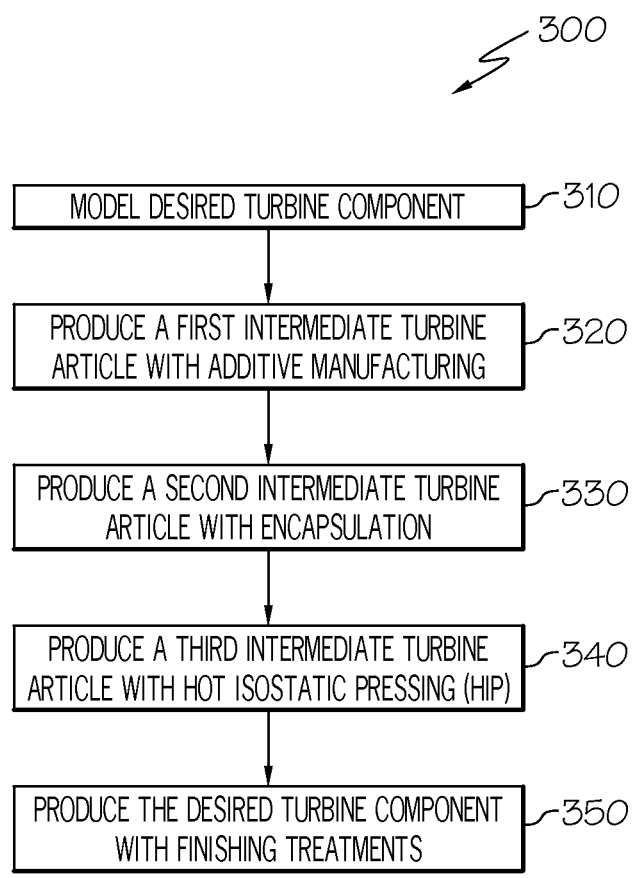
FIG. 3 is a flowchart of a method for manufacturing the turbine component of FIG. 2 in accordance with an exemplary embodiment.

FIG. 3 is a flowchart of a method 300 for manufacturing a turbine component, such as the turbine component 200 of FIG. 2, in accordance with an exemplary embodiment. The method 300 includes a number of intermediate stages during manufacture of the turbine component, illustrated in the cross-sectional views of FIGS. 4-6, prior to completion of the finished turbine component, illustrated in the cross-sectional view of FIG. 7

In a first step 310, a model, such as a design model, of the turbine component may be defined in any suitable manner. For example, the model may be designed with computer aided design (CAD) software. The model may include 3D numeric coordinates of the entire configuration of the component including both external and internal surfaces of an airfoil, platform and dovetail, as well as any internal channels and openings. In one exemplary embodiment, the model may include a number of successive 2D cross-sectional slices that together form the 3D component.

In a second step 320 and additionally referring to FIG. 4, a first intermediate turbine article 400 is produced according to the model of step 310 using a rapid prototyping or additive layer manufacturing process. Some examples of additive layer manufacturing processes include: micro-pen deposition in which liquid media is dispensed with precision at the pen tip and then cured; selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. In general, additive manufacturing techniques provide flexibility in free-form fabrication without geometric constraints, fast material processing time, and innovative joining techniques.

In one particular exemplary embodiment, direct metal laser sintering (DMLS) is used to produce the first intermediate turbine article 400. DMLS is a commercially available laser-based rapid prototyping and tooling process by which complex parts may be directly produced by precision melting and solidification of metal powder into successive layers of larger structures, each layer corresponding to a cross-sectional layer of the 3D component. Further details about an exemplary DMLS technique are provided below with reference to FIG. 8. As shown in the first intermediate turbine article 400 of FIG. 4, additive layer manufacturing processes such as DMLS may result in both internal porosity and cracks 402 and surface porosity and cracks (or surface connected defects) 404 within the solidified substrate 406. The term "porosity" used herein refers to a defect that comprises small spaces or voids within the solidified substrate 406. The term "cracks" used herein refers to linear defects or voids within the solidified substrate 406, for example, with an aspect ratio greater than three to one. Thus, for high performance parts that operate in high stress and high temperature environments, the first intermediate turbine article 400 produced by DMLS may contain porosity and crack defects and may not suitable for use without further processing.

In a subsequent step 330 and additionally referring to FIG. 5, a second intermediate turbine article 500 is produced by encapsulating the first intermediate turbine component 400 (FIG. 4) with an encapsulation layer 506. As noted above, the additive manufacturing techniques used in step 310 may result in internal porosity and cracks 402 and surface porosity and cracks 404 in the substrate 406. The encapsulation layer 506 functions to effectively convert any surface porosity and cracks into internal porosity and cracks. For example, the surface porosity and cracks 404 of FIG. 4 are effectively internal porosity and cracks in FIG. 5 as a result of the encapsulation layer 506. Any suitable encapsulation process may be provided that bridges and covers the porosity and cracks 404 in the surface of the substrate 406. For example, the encapsulation layer 506 may have a thickness of approximately 10-100 μm, although any suitable thickness may be provided. In one exemplary embodiment, the encapsulation layer 506 may be a metal or alloy that is compatible with the substrate 406 and may be applied by a plating or coating process, as described below.

In various exemplary embodiments, the encapsulation process of step 330 may include electroless plating or electroplating processes to form the outer encapsulation layer 506. For example, electroless nickel plating is a chemical reduction process that uses a catalytic reduction process of nickel ions in an aqueous solution containing a chemical reducing agent and the subsequent deposition of nickel metal without the use of electrical energy. The reducing agent may be, for example, boron, and the boron may undergo solid state diffusion away from the surface to minimize suppression of the melting point and to enable subsequent oxidation coatings such as Pt—Al or simple aluminide. Additionally, electroless nickel may not require electrical contact points such that bare spots can be eliminated by movement of fixture contact points. In another example, a nickel electroplating process uses the receiving component as a cathode and an application component as an anode submerged in a solution of electrolyte containing dissolved metal salts, for example in a chloride based bath. The anode and cathode are connected to an external power source of direct current. This results in the transfer of the nickel coating from the solution to the component. In either process, uniform thicknesses and concentrations may be achieved. Electro-deposit thickness uniformity may be improved with the use of conforming anodes, and any bare spots created at electrical contact points may be reduced by alternating the location of the contact point during the plating process. The dimensions of the DMLS component may be modified to accommodate the plating build-up to allow the plated finished turbine component to meet finished part dimensions. In further embodiments, the encapsulation layer 506 may include cobalt plating, sol-gel chemical deposition techniques, or low pressure plasma sprays.

In a step 340 and additionally referring to FIG. 6, a third intermediate turbine article 600 is produced by a consolidation process, such as a hot isostatic pressing (HIP) process in which the second intermediate turbine component 500 (FIG. 5) is subjected to elevated temperatures and pressures over time. The HIP process may be performed at any temperature, pressure, and time that are suitable for forming a compacted solid having negligible porosity. In one embodiment, the HIP process may be performed at a processing temperature in a range of about 1000° C. to about 1300° C. and may be performed at a pressure in a range of about 1 ksi to about 25 ksi for a time period of about 1 to about 10 hours. In other embodiments, the HIP processing temperature, pressure, and time may be smaller or larger.

In general, the HIP process will not reduce defects such as porosity or cracks that are connected to the surface of the component. As such, the encapsulation layer 506 provided in previous step 330 functions to internalize any such surface connected defects (e.g., surface connected porosity and cracks) such that the HIP process is effective for all or substantially all of the cracks or porosity in the DMLS substrate 406, including cracks and porosity that would otherwise be external, such as surface porosity and cracks 404 in FIG. 4. The reduction in defects, such as porosity and cracks, resulting from the HIP process, as illustrated in FIG. 6, yields improved overall mechanical properties, including tensile and stress rupture strengths.

In a step 350 and additionally referring to FIG. 7, a final turbine component 700 is produced by applying one or more finishing treatments to the third intermediate turbine article 600 (FIG. 6). The finishing treatments may include, for example, additional heat, aging, annealing, quenching, or surface treatments. Although step 350 is referred to as a finishing treatment, such treatments may also be used prior to step 330 or step 340. For example, surface peening or polishing may be provided prior to step 330 to reduce surface cracks. One exemplary finishing treatment includes removal of the encapsulation layer 506 (FIG. 6). Subsequent to any finishing steps, the turbine component 700 may be installed in a turbine section of a gas turbine engine, as shown in FIG. 1. In some exemplary embodiments, no such finishing treatments are necessary. For example, the encapsulation layer 506 (FIG. 6) may remain on the finished turbine component 700 and provide oxidation protection.

Figure 8:
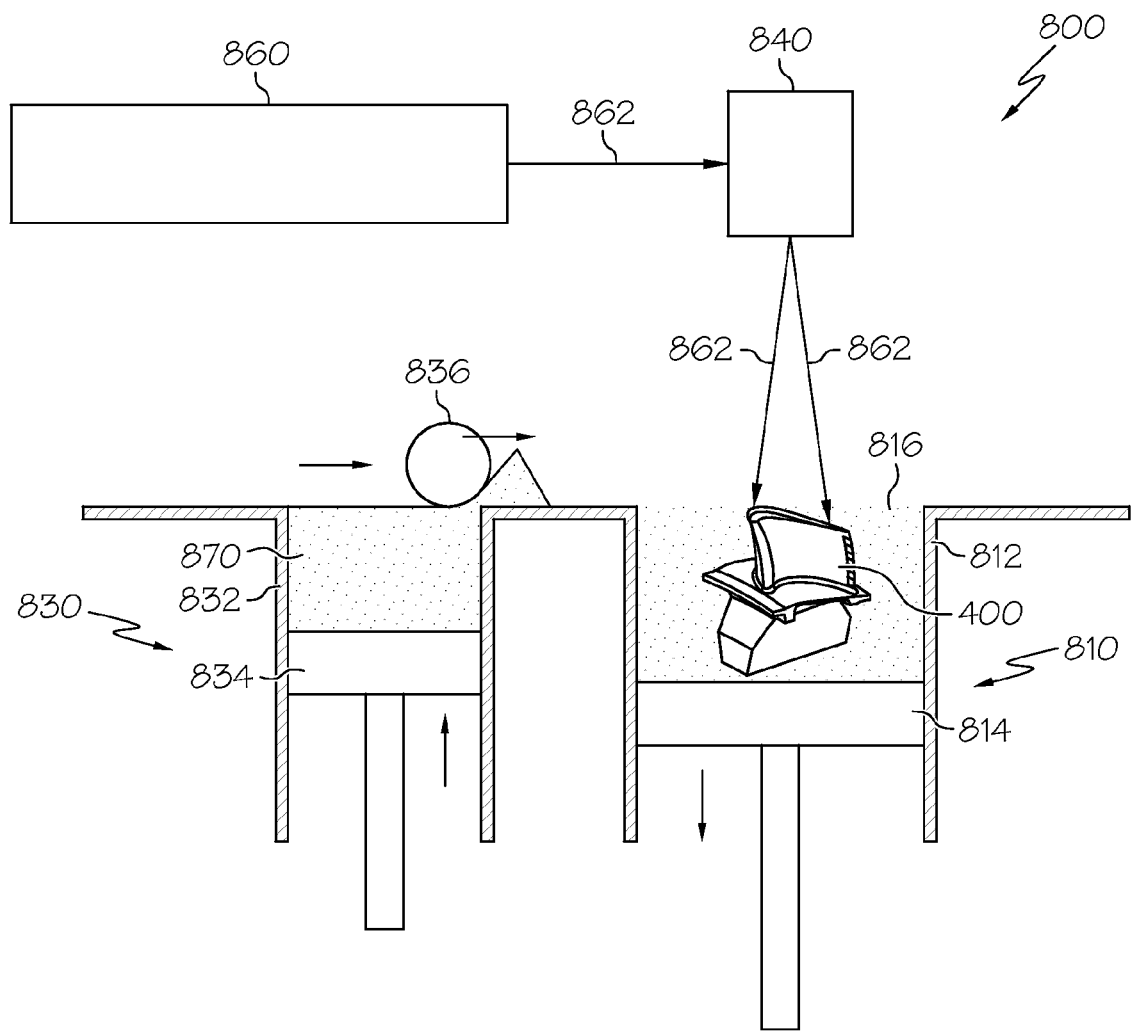
FIG. 8 is a system for forming the first intermediate turbine article of FIG. 4 in accordance with an exemplary embodiment.

FIG. 8 is a system 800 for forming the first intermediate turbine article 400 described above in step 310 of method 300 and shown in FIG. 4 in accordance with an exemplary embodiment. As noted above, the system 800 may be an additive manufacturing system such as a DMLS system that includes a fabrication device 810, a powder delivery device 830, a scanner 840, and a laser 860 and functions to produce the first intermediate turbine article 400 from build material 870.

The fabrication device 810 includes a build container 812 with a fabrication support 814 carrying the turbine article 400 to be formed from the build material 870. The fabrication support 814 is movable within the build container 812 in a vertical direction and is adjusted in such a way to define a working plane 816. The delivery device 830 includes a powder chamber 832 with a delivery support 834 that supports the build material 870 and is also movable in a vertical direction. The delivery device 830 further includes a roller or wiper 836 that transfers build material 870 from the delivery device 830 to the fabrication device 810.

During operation, the fabrication support 814 is lowered and the delivery support 834 is raised. The roller or wiper 836 scraps or otherwise pushes a portion of the build material 870 from the delivery device 830 to form the working plane 816 in the fabrication device 810. The laser 860 emits a laser beam 862, which is directed by the scanner 840 onto the build material 870 in the working plane 816 to selectively fuse the build material 870 into a cross-sectional layer of the turbine article 400. More specifically, the laser beam 862 selectively fuses the powder of the build material 870 into larger structures by rapidly melting the powder particles. As the scanned laser beam 862 moves on, heat is conducted away from the previously melted area, thereby leading to rapid cooling and resolidification. As such, based on the control of the laser beam 862, each layer of build material 870 will include unsintered build material 870 and sintered build material that forms the cross-sectional layer of the turbine article 400. Any suitable laser and laser parameters may be used, including considerations with respect to power, laser beam spot size, and scanning velocity. The build material 870 may be formed by any suitable powder, including metal powders, such as a stainless steel powder, and alloys and super alloy materials, such as nickel-based or cobalt superalloys. In one exemplary embodiment, the build material 870 is a high temperature nickel base super alloy such as MAR-M-247. In other embodiments, IN718 or IN738 or other suitable alloys may be employed. The powder build material 870 may be selected for enhanced strength, durability, and useful life, particularly at high temperatures. Each successive layer may be, for example, between 10 μm and 200 μm, although the thickness may be selected based on any number of parameters.

Upon completion of a respective layer, the fabrication support 814 is lowered and the delivery support 834 is raised. The roller or wiper 836 again pushes a portion of the build material 870 from the delivery device 830 to form an additional layer of build material 870 on the working plane 816 of the fabrication device 810. The laser beam 862 is again controlled to selectively form another cross-sectional layer of the first intermediate turbine article 400. This process is continued as successive cross-sectional layers are built into the first intermediate turbine article 400. When the laser sintering process is completed, the unsintered build material 870 is removed and the first intermediate turbine article 400 is removed from the fabrication device 810 in anticipation of the subsequent steps discussed above. Although the DMLS process is described herein, other suitable additive manufacturing processes may be employed to fabricate the first intermediate turbine article 400.

Figure 9:
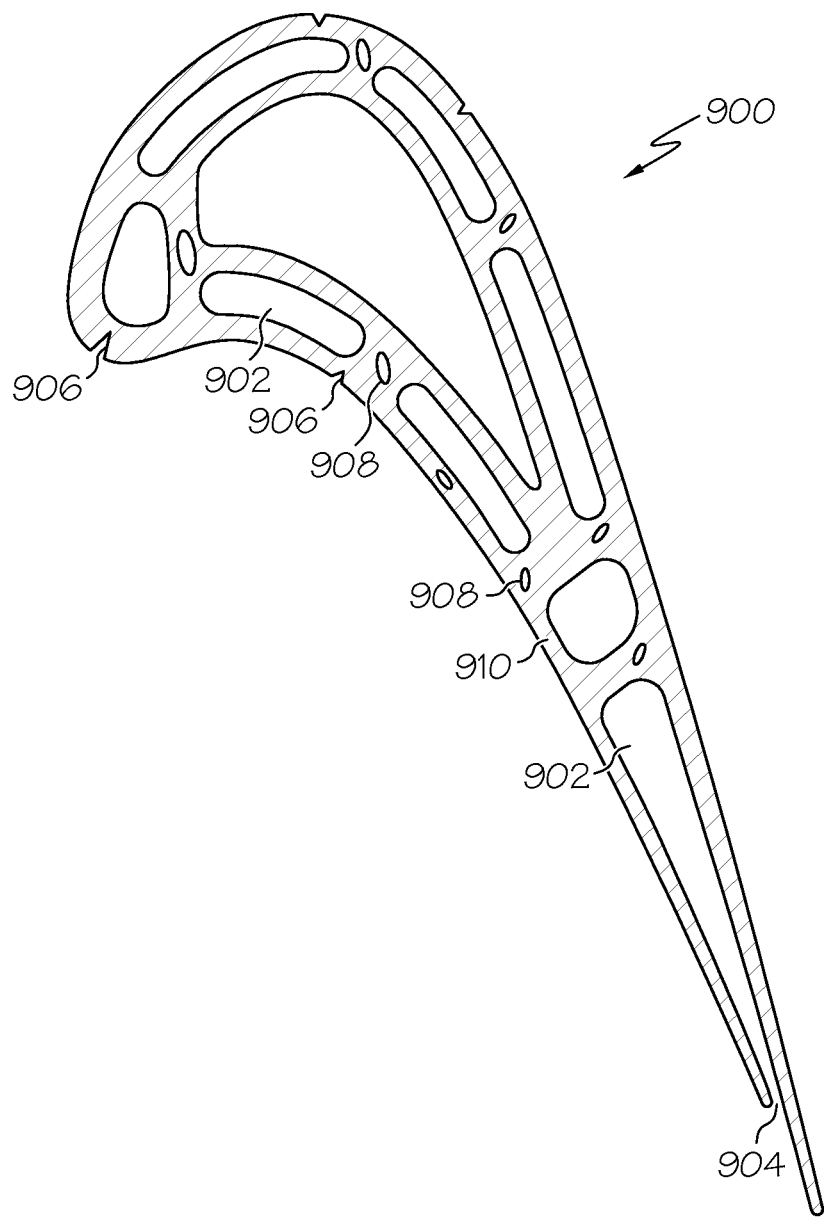
FIG. 9 is a cross-sectional view of a first intermediate turbine article in the method of FIG. 3 in accordance with an alternate exemplary embodiment.

As noted above, the intermediate turbine articles 400, 500, 600 and finished turbine component 700 are generally solid throughout. However, the exemplary method 300 discussed above may be used to form turbine components with one or more cooling passages. FIGS. 9-12 are successive cross-sectional views of the method 300 applied to a turbine component with cooling passages, such as those in cooled high effectiveness advanced turbine (HEAT) blade and nozzle parts. Such turbine components may be capable of withstanding higher temperatures and stresses, thereby leading to further improvements in engine performance. For example, FIG. 9 shows a first intermediate turbine article 900 formed by an additive manufacturing process, such as the DMLS process described above. The first intermediate turbine article 900 includes cooling passages 902 that deliver a cooling flow to the finished turbine component via an inlet (not shown) during engine operation. The cooling flow exits out various cooling holes (not shown) and out the trailing edge exit slot 904. The cooling passages 902 may be relative complex and intricate for tailoring the use of the limited pressurized cooling air and maximizing the cooling effectiveness thereof and the overall engine efficiency. As a result of the additive manufacturing process, the first intermediate turbine article 900 may also include surface connected porosity and cracks 906 and internal porosity and cracks 908 within the material substrate 910. In a subsequent step, shown in FIG. 10, a second intermediate turbine article 1000 is produced by encapsulating the first intermediate turbine article 900 in an encapsulation layer 1002. The encapsulation layer 1002 may be formed, for example, by a plating or coating process. In this exemplary embodiment, the aqueous solution or electrolytic fluid is pumped through the internal cooling passages 902 to ensure that a thin encapsulating layer 1002 of plating spans the surface porosity and cracks 906 within the cooling passages 902 and on the external surface. The encapsulation layer 1002 effectively converts the surface connected cracks and porosity 906 into internal porosity and cracks 908.

Figure 10:
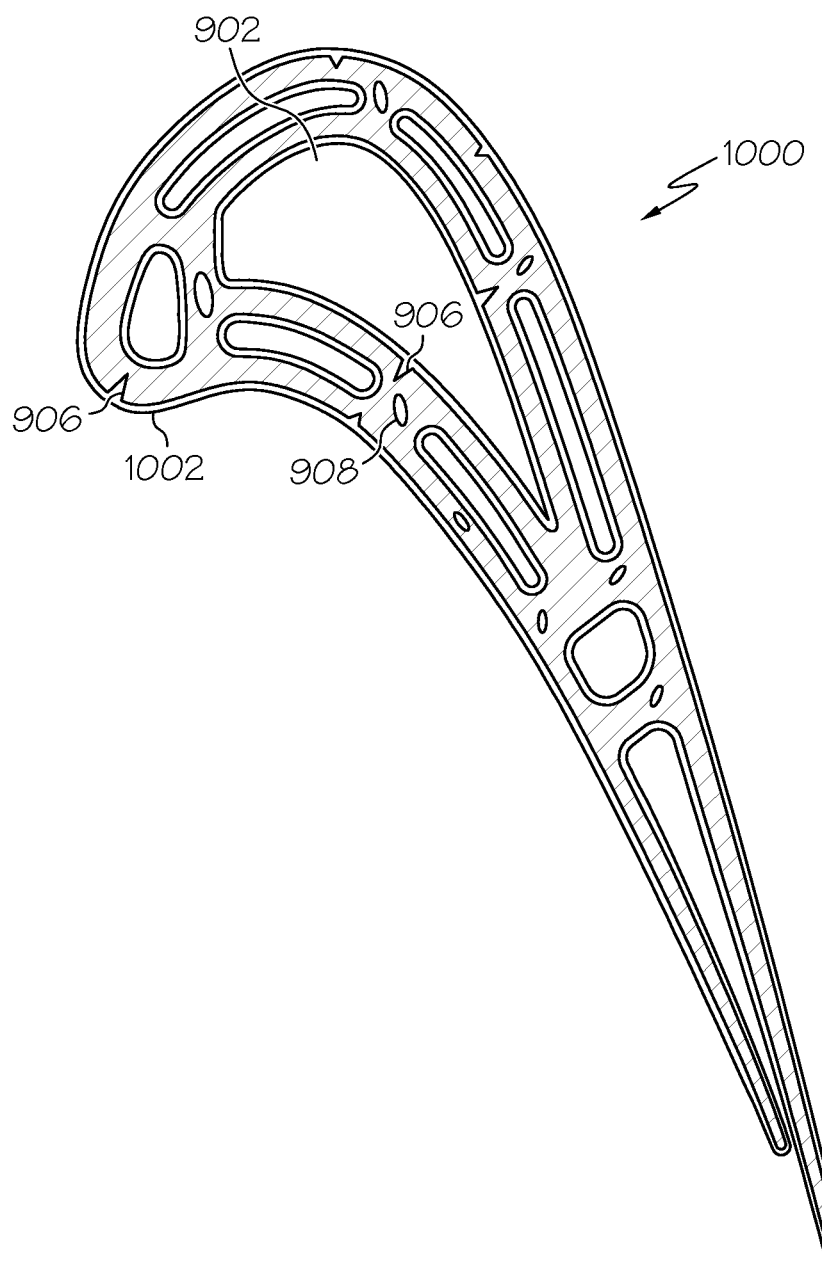
FIG. 10 is a cross-sectional view of a second intermediate turbine article in the method of FIG. 3 in accordance with an alternate exemplary embodiment.
Figure 11:
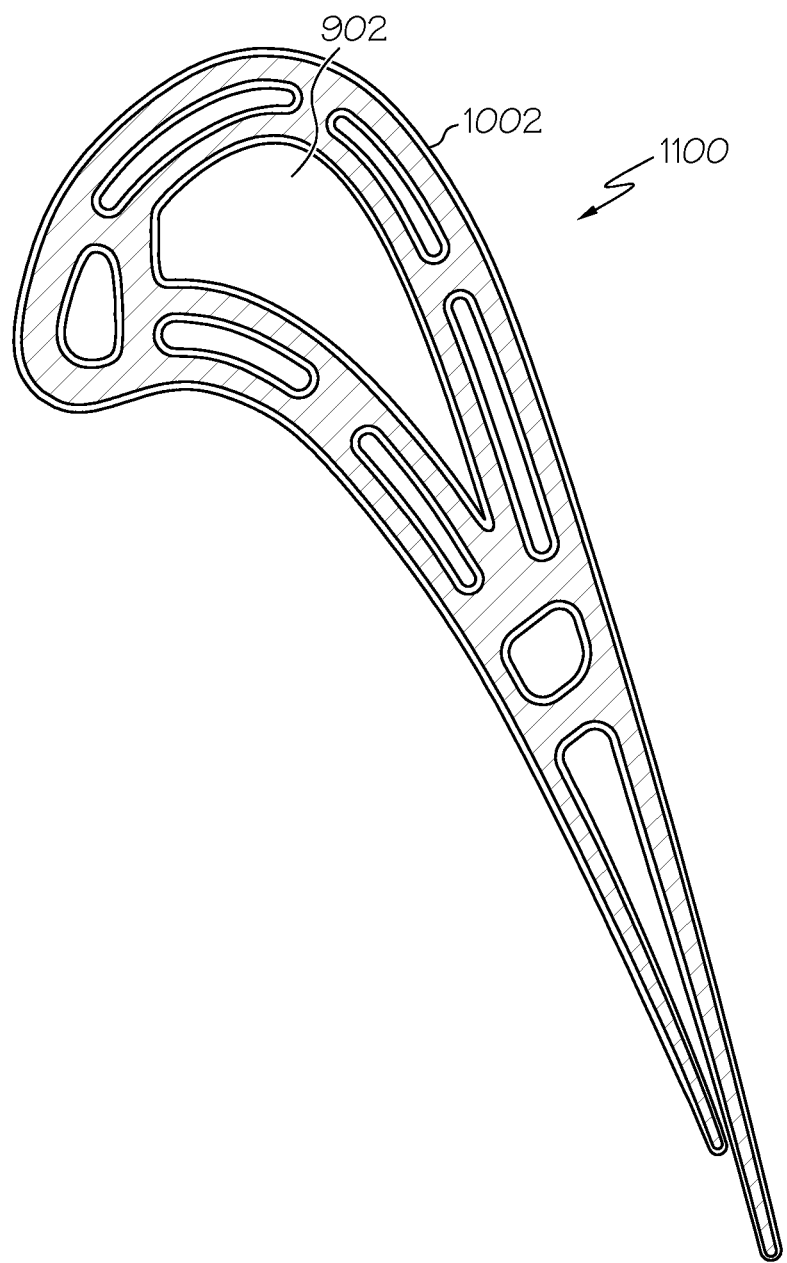
FIG. 11 is a cross-sectional view of a third intermediate turbine article in the method of FIG. 3 in accordance with an alternate exemplary embodiment.
Figure 12:
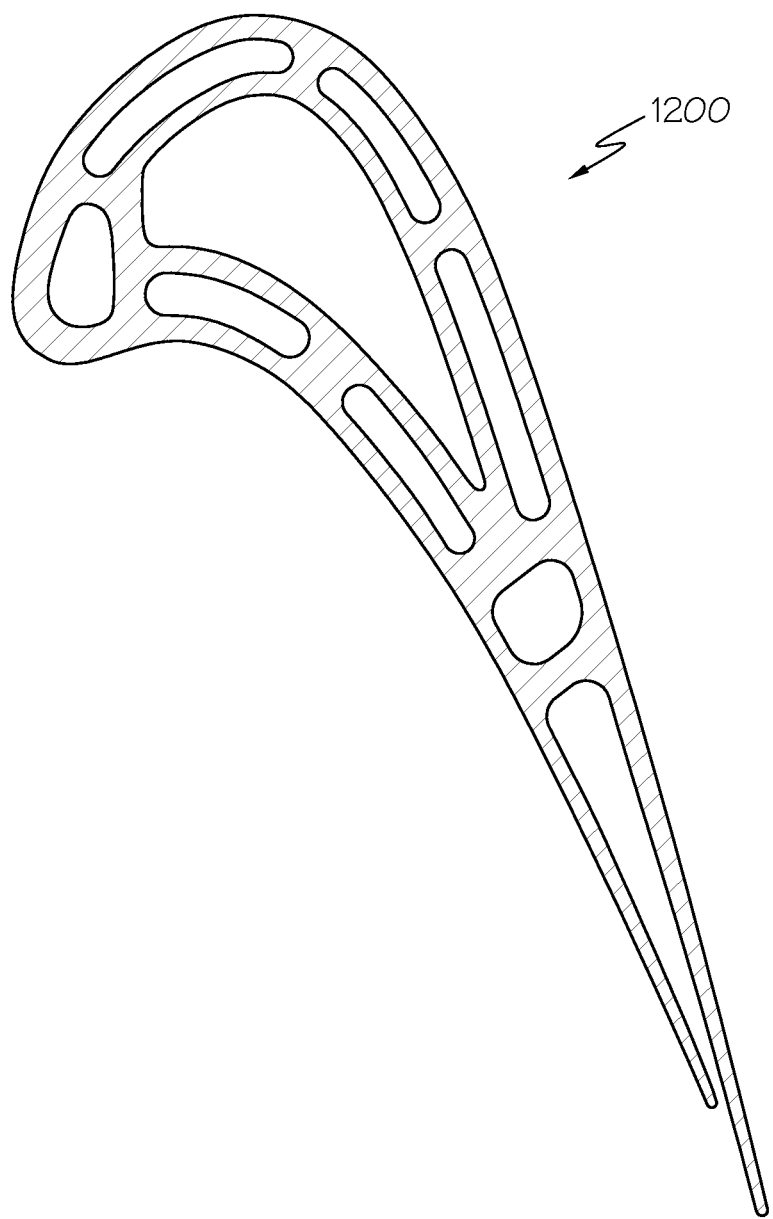
FIG. 12 is a cross-sectional view of a completed turbine component in the method of FIG. 3 in accordance with an alternate exemplary embodiment.

In the next step, as shown in FIG. 11, a third intermediate turbine article 1100 is formed by consolidating the second intermediate turbine article 1000, for example, with a HIP process. The consolidation process eliminates or substantially decreases the porosity and cracks 906, 908, including the porosity and cracks 906 that would otherwise be surface connected porosity and cracks. In a final step, as shown in FIG. 12, a finished component 1200 is produced with finished processes, which may include the removal of the encapsulation layer 1002 (FIG. 10).

Accordingly, exemplary embodiments may eliminate or reduce both internal and external porosity and cracking in turbine components fabricated with additive manufacturing techniques. These methods enable rapid prototyping and manufacturing. This is particularly true due to the iterative nature of engine design. After engine testing, it is often discovered that the turbine requirements to match the engine as a system for optimal performance or durability may be different than originally predicted and fabricated. Exemplary embodiments discussed herein provide rapid prototyping to reduce costs and cycle time in the engine design. Exemplary embodiments are applicable to both commercial and military gas turbine engines and auxiliary power units, including industrial applications such as electricity generation, naval propulsion, pumping sets for gas and oil transmission, aircraft and/or spacecraft propulsion, automobile engines, and/or stationary power plants.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. Various changes may be made in the function and arrangement of elements described in an exemplary embodiment without departing from the scope of the invention as set forth in the appended claims.

What is claimed is:

1. A method for manufacturing a turbine component, comprising the steps of:
   forming a first intermediate turbine article with an additive manufacturing process, the first intermediate turbine article including internal surfaces forming internal cooling passages;
   encapsulating the first intermediate turbine article with an encapsulation layer to form a second intermediate turbine article, the encapsulating step including depositing a portion of the encapsulation layer on the internal surfaces within the internal cooling passages;
   consolidating the second intermediate turbine article to produce the turbine component, wherein the consolidating step includes consolidating the second intermediate turbine article to form a third intermediate turbine article, the consolidating step further including consolidating the portion of the encapsulation layer on the internal surfaces within the internal cooling passages; and
   finishing the third intermediate turbine article to produce the turbine component, wherein the finishing step includes removing the encapsulation layer.

2. The method of claim 1, wherein the forming step includes: defining a three-dimensional model of the turbine component; and converting the three-dimensional model to a plurality of slices that each define a cross-sectional layer of the turbine component.

3. The method of claim 1, wherein the forming step includes metallic additive manufacturing using a high energy density beam, the high energy density beam including at least one of laser beam, electron beam, plasma jet, or electric arc.

4. The method of claim 3, wherein the metallic additive manufacturing step includes one of sintering or melting a powdered metal to form the first intermediate turbine article in successive layers.

5. The method of claim 1, wherein the encapsulating step includes converting surface connected defects of the first intermediate turbine article to internal defects in the second intermediate turbine article.

6. The method of claim 1, wherein the encapsulating step includes bridging surface connected defects in the first intermediate turbine article.

7. The method of claim 1, wherein the consolidating step includes hot isostatic pressing.

8. The method of claim 1, wherein the encapsulating step includes at least one of nickel plating, cobalt plating, aluminide coating, sol gel chemical deposition, or low pressure plasma spray.

9. The method of claim 1, wherein the consolidating step includes decreasing any internal porosity and cracks of the second intermediate turbine article.

10. The method of claim 1, wherein the first intermediate turbine article includes internal porosity and cracks and surface porosity and cracks, and wherein the consolidating step includes decreasing the internal porosity and cracks and the surface porosity and cracks.

11. A method for manufacturing a turbine component, comprising the steps of:
- forming a first intermediate turbine article with an additive manufacturing process with a nickel-based superalloy, the first intermediate turbine article including internal surfaces forming internal cooling passages;
- encapsulating the first intermediate turbine article with an encapsulation layer to form a second intermediate turbine article, the encapsulating step including converting surface porosity and cracks of the first intermediate turbine article to internal porosity and cracks in the second intermediate turbine article, the encapsulating step including depositing a portion of the encapsulation layer on the internal surfaces within the internal cooling passages;
- hot isostatic pressing the second intermediate turbine article to produce a third intermediate turbine article; and
- removing the encapsulation layer from the third intermediate turbine article to produce the turbine component.

12. The method of claim 1, wherein the forming step includes forming the first intermediate turbine article with a nickel-based superalloy.

13. The method of claim 1, wherein the finishing step includes finishing the third intermediate turbine article to produce a rotor blade.

14. The method of claim 1, wherein the encapsulating step includes at least one of nickel plating, cobalt plating, aluminide coating, or low pressure plasma spray.

* * * * *